United States Patent
Tsuchiya et al.

(10) Patent No.: US 7,352,486 B2
(45) Date of Patent: Apr. 1, 2008

(54) PRINTER

(75) Inventors: Noriaki Tsuchiya, Ebina (JP);
Yasuhiko Endo, Ebina (JP); Masahiko Kikuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 73 days.

(21) Appl. No.: 11/405,435

(22) Filed: Apr. 18, 2006

(65) Prior Publication Data

US 2006/0187480 A1 Aug. 24, 2006

Related U.S. Application Data

(62) Division of application No. 09/655,062, filed on Sep. 5, 2000, now Pat. No. 7,057,754.

(30) Foreign Application Priority Data

Dec. 24, 1999 (JP) ................. 11-367128

(51) Int. Cl.
*G06K 15/00* (2006.01)
*B41B 15/00* (2006.01)
*G01R 31/28* (2006.01)

(52) U.S. Cl. ............... 358/1.15; 358/1.13; 358/1.14; 358/1.16; 714/32

(58) Field of Classification Search ............. 358/1.13, 358/1.14, 1.15, 1.1
See application file for complete search history.

(56) References Cited

U.S. PATENT DOCUMENTS 5,751,925 A * 5/1998 Kataoka et al. ............ 358/1.16
5,844,813 A    12/1998 Tateyama
6,509,975 B1 * 1/2003 Motegi ..................... 358/1.14

FOREIGN PATENT DOCUMENTS

| JP | A-6-238991  | 8/1994  |
|----|-------------|---------|
| JP | A-08-101606 | 4/1996  |
| JP | A-8-324071  | 12/1996 |
| JP | A-11-110089 | 4/1999  |

* cited by examiner

*Primary Examiner*—King Y. Poon
*Assistant Examiner*—Neil R McLean
(74) *Attorney, Agent, or Firm*—Oliff & Berridge, PLC

(57) ABSTRACT

The printer includes a CPU, a bridge image processing unit, a RAM, a ROM, a supply power control unit, a printing unit, a communication I/F, and physical layer I/Fs. When the Ethernet is connected to the communication I/F, if the DMA transfer request signal is not outputted from the DMAC for more than a specific time, the supply power control unit shifts into the sleep mode that halts the supplies of clock to the CPU, etc.; and if data is received from the host computer group, the supply power control unit releases the sleep mode. Further, in case that equipment conforming to the USB standard or the IEEE 1284 is connected to the communication I/F, if the DMA transfer request signal is not outputted from the DMAC for more than the specific time, the supply power control unit shifts into the power halt mode that halts the supply of power to the CPU, etc. Thus, the invention provides a printer capable of effectively reducing the power consumption.

8 Claims, 13 Drawing Sheets

NORMAL OPERATION MODE

SLEEP MODE

PRINTER

This is a Division of application Ser. No. 09/655,062 filed Sep. 5, 2000 now U.S. Pat. No. 7,057,754. The entire disclosure of the prior application is hereby incorporated by reference herein in its entirety.

BACKGROUND OF THE INVENTION

1. Field of the Invention

The present invention relates to a printer, more specifically to a printer capable of a power saving control.

2. Description of the Related Art

In recent years, a demand for the power saving in the field of electronics such as printers has increasingly expanded. For example, to meet such a demand, the electronics field has provided a printer that realizes to save a power by shifting a data transfer mode into a sleep mode while the detected is not transferred and releasing the sleep mode when the data transfer is detected.

For example, the Japanese Published Unexamined Patent Application No. Hei 8-324071 has disclosed a printer control unit in which, while the supply of power to the units of the printer main frame except the units having communication functions with the host processor is shifted into the sleep mode when information is received from the host processor, the control unit including a CPU, ROM, RAM, etc., analyzes the information received, judges whether to or not to receive information to start the supply of power, and controls whether to or not to resume the supply of power in accordance with the judgment result. According to this printer control unit, the printer control unit is not needed to resume the supply of power unnecessarily every time it receives data from the host processor, which effects to restrain the power consumption.

However, in the foregoing conventional technique, the printer control unit is always monitoring whether to or not the receive the information to start the supply of power, and accordingly, the supply of power to the CPU, ROM, RAM, etc., that constitute the control unit is always necessary, which accompanies power consumption even in the sleep mode. In recent years, however, the power consumption by the CPU concerned with the communication control and the memories such as ROM, RAM, etc., is no longer considered negligible. Accordingly, it is necessary to reduce the power consumption not only by the printer main frame but by the CPU concerned with the communication control and the ROM, RAM, etc.

SUMMARY OF THE INVENTION

The present invention has been made in view of the above circumstances, and provides a printer that enhances the power saving capability.

A printer according to one aspect of the invention is provided with a printing part that prints on the basis of print data from a host device, a control part that operates by clock input and controls the printing part, a first communication interface connected individually to the host device, and a second communication interface connected commonly to the host device. The printer further includes: a judgment part that judges connection states of the first communication interface and the second communication interface; and a setting part that sets into a power halt mode to shut off both powers to the printing part and the control part when the first communication interface is in the connection state, and sets into a sleep mode to shut off the power to the printing part and halt a clock to the control part when the second communication interface is in the connection state.

The printing part is controlled by the control part that operates by a clock input, and executes the printing on the basis of print data transmitted from the host device. The first communication interface is connected individually to the host device: namely, it is connected in one to one correspondence with the host device. The first communication interface is one capable of making the host device wait for the data transmission, namely, the one capable of executing handshake control. This interface includes the USB (Universal Serial Bus) as a serial interface, and the IEEE (Institute of Electrical and Electronics Engineers) 1284 as a parallel interface, etc.

The second interface is connected commonly to the host device: namely, it is connected commonly to plural host devices. The second communication interface has a difficulty in handshaking with the host device. This interface includes, for example, the 100BASE-T conforming to the standard of the Ethernet that can implement a high speed transfer in a LAN (Local Area Network).

The judgment part judges the connection states of the first communication interface and the second communication interface. The connection state can be acquired by monitoring the state of a specific signal line.

The setting part sets into the power halt mode that shuts off both the powers to the printing part and the control part except for the setting part, and the first and second communication interfaces, when the first communication interface is in the connection state. That is, as in the USB, when the communication interface is capable of handshaking with the host device, even in case of receiving data from the host device after shifting into the power halt mode, the communication interface is able to set a wait to the host device until the control part starts. Accordingly, the supplies of power to the printing part and the control part can be halted, thus achieving significant reduction of the power consumption. Further, it is preferable that the supply lines of power to the setting part, printing part, and control part are made each separately so as to supply the powers independently. Moreover, the supply of the power to the main memory such as a RAM other than the power to the control part and the printing part may be halted. Thereby, a still more power saving can be achieved.

On the other hand, when the second communication interface is in the connection state, the setting part sets into the sloop mode that shuts off the power to the printing part and halts a clock to the control part. That is, in case of the communication interface having a difficulty in handshaking with the host device, such as the Ethernet, since it is not able to set a wait to the host device until the control part starts, the communication interface does not shut off the supply of power to the control part, but halts only the clock. Thereby, when receiving the data from the host device, the interface is able to start the control part. Incidentally, to halt only the clock will achieve significant power saving.

Further, the release of the sleep mode and the power halt mode can be implemented by making the first or the second communication interface generate an interrupt signal when receiving data from the host device, and informing the control part.

In a printer according to another aspect of the invention, when the setting part receives data from the host device during setting the power halt mode, the setting part releases the power halt mode and makes the host device wait for data transmission, until the control part completes start processing.

As mentioned above, in case of a communication interface such as the USB, which is capable of handshake control with the host device, the setting part is able to continue the communication normally by setting a wait to the host device until the control part starts, even when receiving data from the host device in the power halt mode now being set.

Further, according to another aspect of the invention, the setting part may release the sleep mode, when the setting part receives data from the host device during setting the sleep mode. In this manner, since the sloop mode is maintained till the moment directly before receiving the data, efficient power saving control can be carried out. And, in the sleep mode, since it is supplied with the power and is halted with the clock only, the control part is able to start swiftly.

A printer according to another aspect of the invention is provided with a printing part that prints on the basis of print data from a host device, and a control part that operates by clock input and controls the printing part, having a sleep mode in which the power to the printing part is shut off and the control part halts a clock. The printer further includes: a judgment part that judges whether or not reception data from the host device is necessary data for printing in the sleep mode; a storage part that stores the reception data; and a power saving control part that releases the sleep mode when the reception data is necessary data for printing, and erases the reception data stored in the storage part when the reception data is unnecessary data for printing.

In the printer having a sleep mode in which the power to the printing part is shut off and the control part halts a clock, the judgment part judges in the sleep mode whether or not reception data from the host device is necessary data for printing. That is, the judgment part judges whether or not it receives data that is needed to start the control part and the printing part. This received data is stored in the storage part.

The power saving control part releases the sleep mode when the reception data is necessary data for printing. Thereby, the supply of the clock to the control part that has been halted is resumed, and the supply of the power to the printing part is resumed, thereby starting the printing. On the other hand, the power saving control part erases the reception data stored in the storage part when the reception data is unnecessary data for printing. That is, the sleep mode is maintained. Thus, only when the reception data is necessary data for printing, the sleep mode is released, whereby efficient power saving control can be carried out.

Further, according to another aspect of the invention, the power saving control part may release the sleep mode on the basis of a quantity of the reception data stored in the storage part. For example, in case where the setting is made to release the sleep mode when the data stored in the storage part exceeds a specific quantity, the sleep mode Is made not to be released until the data for judging whether it is a data necessary for printing is received. In other words, the specific quantity is varied in accordance with the reception data, whereby an unnecessary release of the sleep mode can be prevented.

A printer according to another aspect of the invention is provided with a printing part that prints on the basis of print data from a host device, and a control part that operates by clock input and controls the printing part, having a sleep mode in which the power to the printing part is shut off and the control part halts a clock. The printer further includes a power saving control part that, before the control part shifts into the sleep mode, receives from the control part and holds information necessary for responding to a request from the host device, thereafter shifts into the sleep mode, and thereafter responds on the basis of the information held by the request from the host device.

In the printer having the sleep mode in which the power to the printing part is shut off and the control part halts a clock, before the control part shifts into the sleep mode, the power saving control part receives information necessary for responding to a request from the host device from the control part and holds the information, and thereafter shifts into the sleep mode. The information that the host device requests includes status information and command information of the printing part, etc. And, after shifting into the sleep mode, the power saving control part responds on the basis of information held in accordance with a request from the host device. That is, before the control part shifts into the sleep mode, since the power saving control part receives the information necessary for responding to a request from the host device and holds the information, even when the host device requests the information during the sleep mode, the power saving control part is able to automatically respond directly to the host device without releasing the sleep mode, namely, without intervention of the control part. Thereby, the release of the sleep mode can be reduced to a great extent, thus reducing power consumption significantly.

Further, according to another aspect of the invention, the power saving control part may include a setting part that sets whether to or not to receive from the control part and hold information necessary for responding to a request from the host device. This may be set individually, depending on whether the request from the host device is status information or command information. Thereby, in compliance with the communication circumstances with the host device, the power saving control can be performed most suitably.

Further, according to another aspect of the invention, the power saving control part may release the sleep mode on the basis of a communication state with the host device. This communication state includes, for example, the frequency, quantity, response time of the communication with the host device, etc. For example, when the frequency of the communication with the host device exceeds a predetermined frequency, the sleep mode may be set to be released. Thereby, in accordance with the communication state with the host device, the power saving control can be performed most suitably.

Further, the timing of releasing the sleep mode may be set individually in accordance with each of the types of data from the host device. It may be set in such a manner that in case of the data from the host device being control data, if the communication frequency exceeds a frequency a, the sleep mode is released; and in case of the data from the host device being print data, if the communication frequency exceeds a frequency b, the sleep mode is released. Further, the timing of releasing the sleep mode may be act to a fixed value every time, or it may be set to an optimal value every time on the basis of the historical data up to that time, before shifting into the sleep mode.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

First Embodiment

Figure 1:
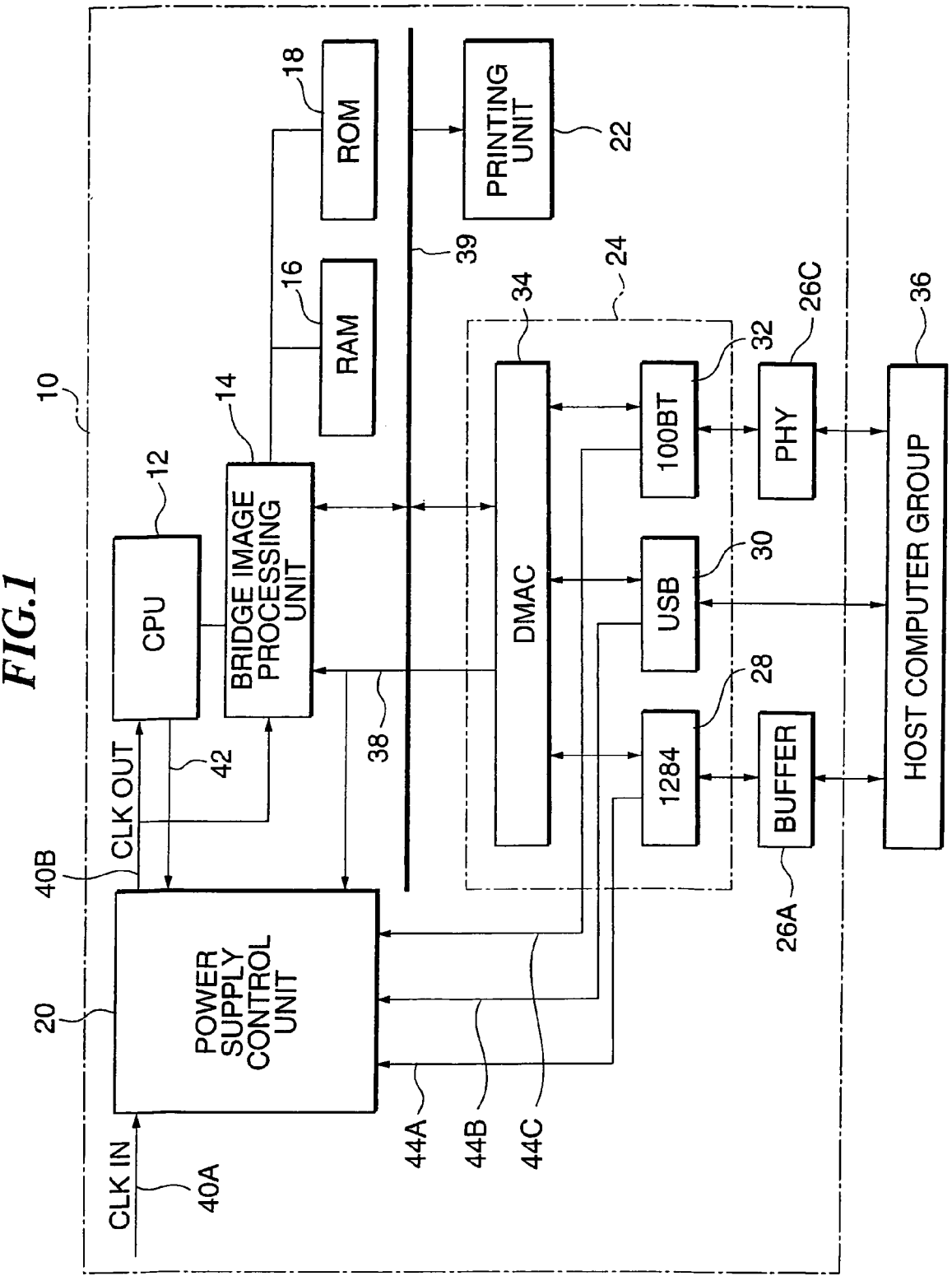
FIG. 1 is a schematic block diagram of a printer relating to the first embodiment.

The first embodiment according to the invention will be described with reference to the accompanying drawings. FIG. 1 illustrates a schematic block diagram of a printer 10 to which the invention is applied.

As shown in FIG. 1, the printer 10 includes a CPU 12 as a control unit and judgment unit, a bridge image processing unit 14, a RAM 16, a ROM 18, a supply power control unit 20 as a setting unit, a character printing unit 22 as a print unit, a communication interface (I/F) 24 corresponding to various communication standards, a buffer 26A, and a physical layer I/F 26C.

The communication I/F 24 contains a 1284 interface 28 as the first communication interface that executes the communication control by the standard 1284 of IEEE (Institute of Electrical and Electronics Engineers), capable of a high speed parallel transfers a USB interface 30 as the first communication interface that executes the communication control by the USB (Universal Serial Bus), capable of a high speed serial transfer, a 100BT interface 32 as the second communication interface that executes the communication control by the standard 100 BASE-T of Ethernet, capable of a high speed transfer in a LAN (Local Area Network), and a DMAC (Direct Memory Access Controller) 34 for executing the DMA transfer.

The 1284 interface 28 is connected to a host computer group 36 by way of the buffer 26A, the USB interface 30 is directly connected to the host computer group 36, and the 100BT interface 32 is connected to the host computer group 36 by way of the physical layer I/F 26C to the host computer group 36. These interfaces each execute the communication controls each in accordance with the communication standards each with the host computer group 36. Incidentally, the CPU 12 is able to recognize whether the Ethernet is connected or not, for example, by reading the status of the physical layer I/F 26C by way of the 100BT interface 32, the DMAC 34, and the bridge image processing unit 14.

Further, the 1284 interface 28, USB interface 30, and 100BT interface 32 each are connected to the DMAC 34.

The data transmitted from the host computer group 36 are outputted to the DMAC 34 by way of the 1284 interface 28, USB interface 30, and 100BT interface 32. The DMAC 34 outputs a DMA transfer request signal 38 to the bridge image processing unit 14, and also outputs input data into a bus 39. The data outputted to the bus 39 is transferred to the RAM 16 being the main memory by way of the bridge image processing unit 14.

The data transferred to the RAM 16 receives an image processing executed by the CPU 12, which is outputted to the printing unit 22 by way of the bridge image processing unit 14. The printing unit 22 prints the inputted data onto a record medium. The ROM 18 connected to the bridge image processing unit 14 stores the programs that the CPU 12 executes, etc.

Now, the printer 10 is provided with the supply power control unit 20 that controls the supply of power and the supply of clock to the CPU 12, bridge image processing unit 14, RAM 16, ROM 18, printing unit 22, and communication I/F 24.

As shown in FIG. 1, the supply power control unit 20 receives a clock 40A from an oscillator not illustrated (CLK IN), and supplies the clock 40A as it is, or a clock 40B with the clock 40A masked to the CPU 12 and the bridge image processing unit 14 (CLK OUT).

Further, the supply power control unit 20 receives a connection signal 42 indicating that the Ethernet is connected from the CPU 12, also receives a DMA transfer request signal 38 from the DMAC 34, and also receives reception interrupt signals 44A, 44B, 44C indicating to have received data from the host computer group 36, from the 1284 interface 28, USB interface 30, and 100BT interface 32.

Figure 2:
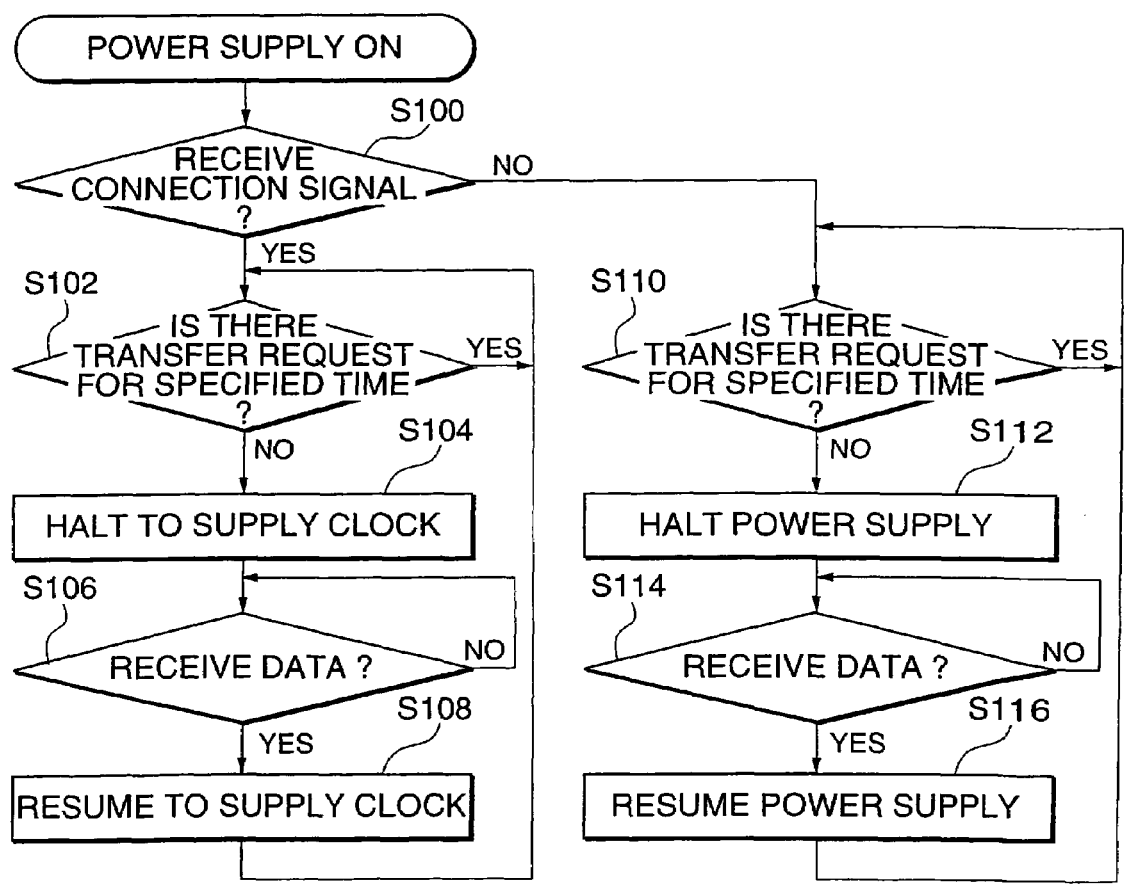
FIG. 2 is a flowchart of a control routine executed in a supply power control unit relating to the first embodiment.

Next, as a function of the first embodiment, the control routine executed by the supply power control unit 20 will be described with reference to the flowchart as shown in FIG. 2.

First, as the printer 10 is powered, the CPU 12 reads the status of the physical layer I/F 26C, and judges whether the Ethernet is connected or not; and if it judges that the Ethernet is connected, the CPU 12 outputs the connection signal 42 to the supply power control unit 20.

At step 100 shown in FIG. 2, the supply power control unit 20 judges whether or not the connection signal 42 is outputted from the CPU 12. And, if the connection signal 42 is judged to be outputted from the CPU 12, namely, if the Ethernet is judged to be connected, the answer at step 100 is yes; and at the next step 102, the supply power control unit 20 judges whether or not the DMA transfer request signal 38 is not outputted for more than a specific time from the DMAC 34, namely, whether or not the DMA transfer request signal 38 is not outputted to the bridge image processing unit 14 for more than the specific time from the DMAC 34, and the DMA transfer is not executed between the DMAC 34 and the RAM 16 for more than the specific time.

And, if the supply power control unit 20 judges that the DMA transfer request signal is outputted, namely, if it judges that the DMA transfer is executed between the DMAC 34 and the RAM 16, the answer at step 102 is no, and the supply power control unit 20 waits until the state in which the DMA transfer request signal 38 is not outputted continues for more than the specific time.

On the other hand, if the supply power control unit 20 judges that the DMA transfer request signal 38 is not outputted for more than the specific time, namely, if it judges that the DMA transfer is not executed between the DMAC 34 and the RAM 16 for more than the specific time, the answer at step 102 is yes, and at the next step 104, the supply power control unit 20 halts the clock that is supplied to the CPU 12 and the bridge image processing unit 14. That is, the current operation mode shifts into the sleep mode. In this state, the clock is continued to be supplied to the communication I/F 24.

Figures 3A, 3B, 3C:
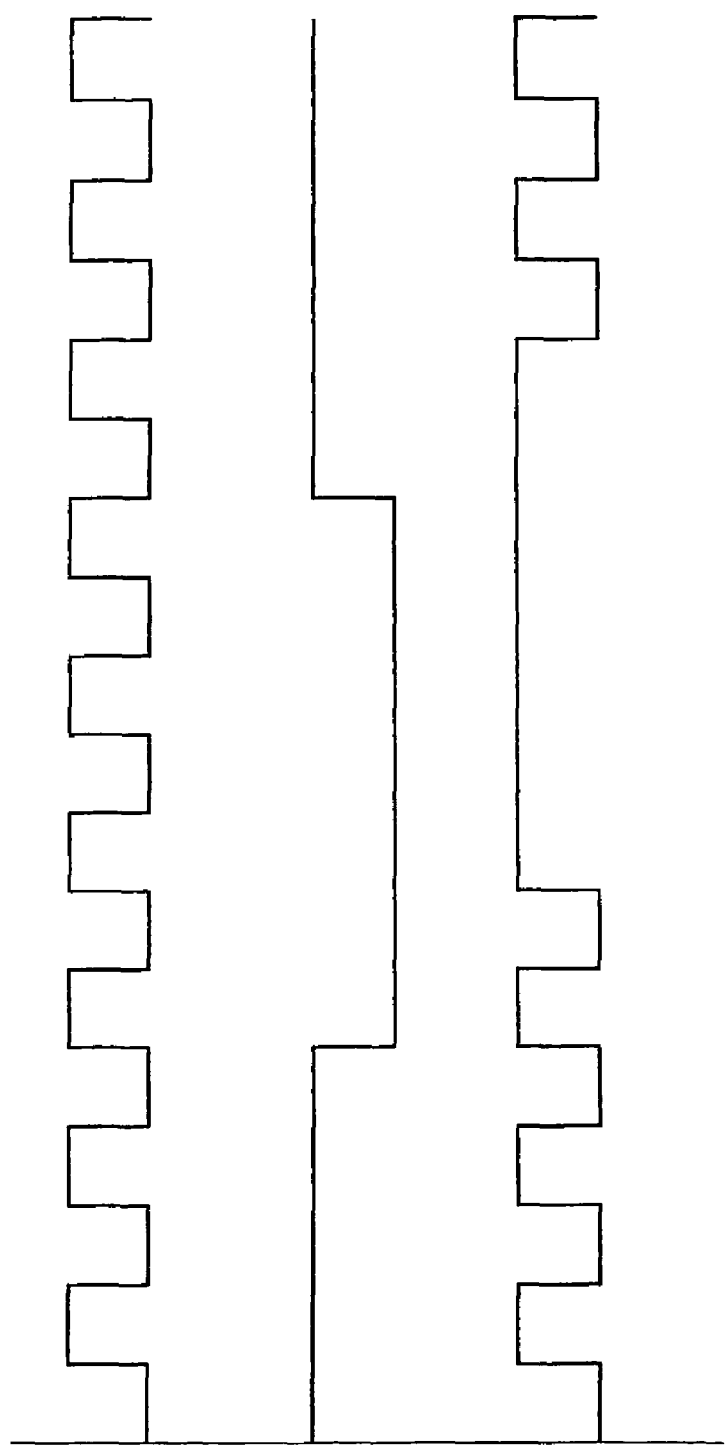
FIG. 3A is a timing chart of a CLOCK IN signal supplied to the supply power control unit.
FIG. 3B is a timing chart of a HALT signal generated in the supply power control unit.
FIG. 3C is a timing chart of a CLOCK OUT signal delivered from the supply power control unit.

The halt of the clock is carried out as follows. If the DMA transfer is judged not to be executed fore more than the specific time between the DMAC 34 and the RAM 16, the HALT state is created in the supply power control unit 20 as shown in FIG. 3B, (the low level interval in FIG. 3). The clock 40A (see FIG. 3A) inputted from the oscillator not illustrated is masked by this HALT state, and the masked clock 40B (see FIG. 3C) is outputted to the CPU 12 and the bridge image processing unit 14. Thereby, the power consumption in the CPU 12 and the bridge image processing unit 14 can be suppressed.

And at step 106, the supply power control unit 20 judges to or not to receive the data from the host computer group 36, namely, whether or not the reception interrupt signals 44A through 44C are outputted from any one of the 1284 interface 28, USB interface 30, and 100BT interface 32.

If not receiving the data from the host computer group 36, namely, if the supply power control unit 20 judges that the reception interrupt signals 44A through 44C are not outputted from any one of the 1284 interface 28, USB interface 30, and 100BT interface 32, the answer at step 106 is no, and the supply power control unit 20 waits until any one of the reception interrupt signals 44A through 44C is inputted.

On the other hand, if receiving the data from the host computer group 36, namely, if the supply power control unit 20 judges that the reception interrupt signals 44A through 44C are outputted from any one of the 1284 interface 28, USB interface 30, and 100BT interface 32, the answer at step 106 is yes, and at the next step 108, the supply power control unit 20 resumes to supply the clock to the CPU 12 and the bridge image processing unit 14. That is, it releases the HALT state (releasing masking: the high level interval) as shown in FIG. 3B, and supplies the clock 40B to the CPU 12 and the bridge image processing unit 14. That is, the supply power control unit 20 releases the sleep mode.

Thereby, the data outputted from the host computer group 36 is transferred by DMA to the RAM 16 by way of the DMAC 34, bus 39, and bridge image processing unit 14. And, the operation returns to step 100 to repeat the same processing as above.

On the other hand, at step 100, the supply power control unit 20 judges whether or not the connection signal 42 is outputted from the CPU 12, and if the connection signal 42 is judged not to be outputted from the CPU 12, namely, if the Ethernet is judged not to be connected, the answer at step 100 is no; and at step 110, the supply power control unit 20 judges whether or not the DMA transfer request signal 38 is not outputted for more than the specific time from the DMAC 34, namely, whether or not the DMA transfer request signal 38 is not outputted to the bridge image processing unit 14 for more than the specific time from the DMAC 34, and the DMA transfer is not executed between the DMAC 34 and the RAM 16 for more than the specific time.

And, if the supply power control unit 20 judges that the DMA transfer request signal 38 is outputted, namely, if it judges that the DMA transfer is executed between the DMAC 34 and the RAM 16, the answer at step 110 is no, and the supply power control unit 20 waits until the state in which the DMA transfer request signal 38 is not outputted continues for more than the specific time.

On the other hand, if the supply power control unit 20 judges that the DMA transfer request signal 38 is not outputted for more than the specific time, namely, if it judges that the DMA transfer is not executed between the DMAC 34 and the RAM 16 for more than the specific time, the answer at step 110 is yes, and at the next step 112, the supply power control unit 20 halts the power having been supplied to the CPU 12, bridge image processing unit 14, RAM 16, ROM 18, and printing unit 22. That is, the current operation mode shifts into the power halt mode. In this state, the power is continued to be supplied to the communication I/F 24.

Thus, the power consumption in the CPU 12, bridge image processing unit 14, RAM 16, ROM 18, and printing unit 22 can be reduced.

And at step 114, the supply power control unit 20 judges to or not to receive the data from the host computer group 36, namely, whether or not the reception interrupt signals 44A, 44B are outputted from either one of the 1284 interface 28 and the USB interface 30.

If not receiving the data from the host computer group 36, namely, if the supply power control unit 20 judges that the reception interrupt signal 44A or 44B is not outputted from the 1284 interface 28 or the USB interface 30, the answer at step 114 is no, and the supply power control unit 20 waits until at least the reception interrupt signal 44A or 44B is inputted.

On the other hand, if receiving the data from the host computer group 36, namely, if the supply power control unit 20 judges that the reception interrupt signal 44A or 44B is outputted from the 1284 interface 28 or the USB interface 30, the answer at step 114 is yes, and at the next step 116, the supply power control unit 20 resumes the supply of power to the CPU 12, bridge image processing unit 14, RAM 16, ROM 18, and printing unit 22. That is, it releases the sleep mode.

Thereby, the CPU 12 starts the BOOT processing (start processing), and at the same time sets a wait to the computer group 36 by way of the 1284 interface 28 and the USB interface 30. And, when the BOOT processing is complete, the CPU 12 releases the wait state from the computer group 36. Then, the data outputted from the host computer group 36 is transferred to the RAM 16 by way of the DMAC 34, bus 39, and bridge image processing unit 14. The supply power control unit 20 returns the routine to step 110 to repeat the same processing as above.

Thus, the supply power control unit 20 halts to supply the clock when the DMA transfer is not executed for more than a specific time and the Ethernet is connected, and it halts the supply of power when the Ethernet is not connected and a device conforming to the IEEE 1284 or a device conforming to the USB is connected. In other words, the supply power control unit 20 halts to supply only the clock when a device conforming to such a communication standard that data is always transmitted as the Ethernet is connected; and it halts the supply of power when a device conforming to a communication standard capable of handshaking with and awaiting the partner as the IEEE 1284 or the USB is connected. Thereby, in accordance with the devices connected, optimal control to save the power can be implemented.

Next, with regard to the transition to the sleep mode in case of connection with the Ethernet, another configuration will further be described with reference to FIG. 4. Here, the same parts as those of the printer 10 in FIG. 1 are given the same symbols, and the detailed explanations thereof will be omitted. Further, to simplify the explanation, the RAM 16, ROM 18, printing unit 22, buffer 26A, physical layer I/F 26C, 1284 interface 28, USB interface 30, host computer group 36, and bus 39 are omitted from FIG. 4.

Figure 4:
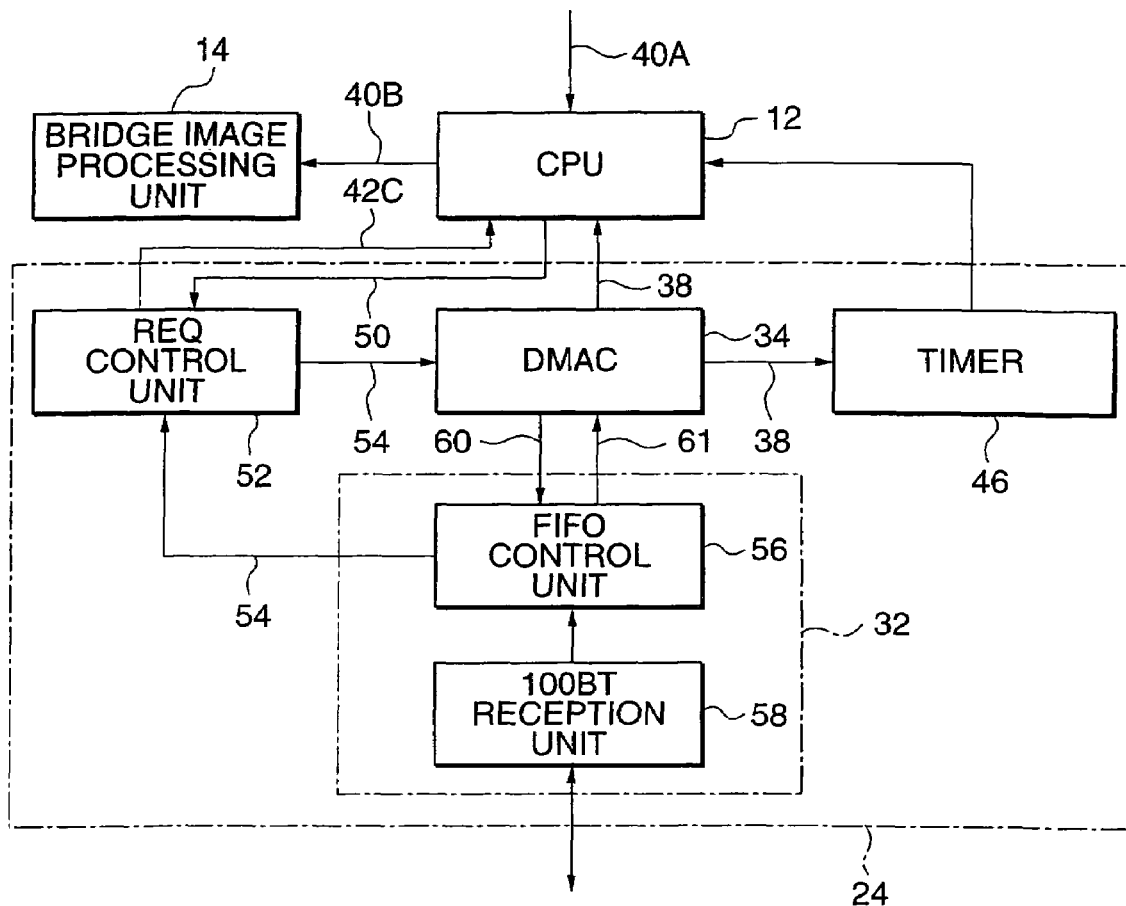
FIG. 4 is a diagram illustrating another example of the printer relating to the first embodiment.

A printer 101 as shown in FIG. 4 incorporates a HALT control unit and a HALT mode register inside the CPU 12, which are not illustrated. Accordingly, the transition from the normal mode to the HALT mode, namely the sleep mode can be implemented by configuring the HALT mode register with software.

Further, the printer 101 is provided with a timer 46 that monitors the DMA transfer request signal 38 outputted from the DMAC 34. The timer 46 counts the negated period of the DMA transfer request signal 38, namely, the period during which the DMA transfer request signal 38 is not outputted. When the counted value of the period reaches a predetermined value, the timer 46 outputs a time-out interrupt signal 48 to the CPU 12.

Figure 5:
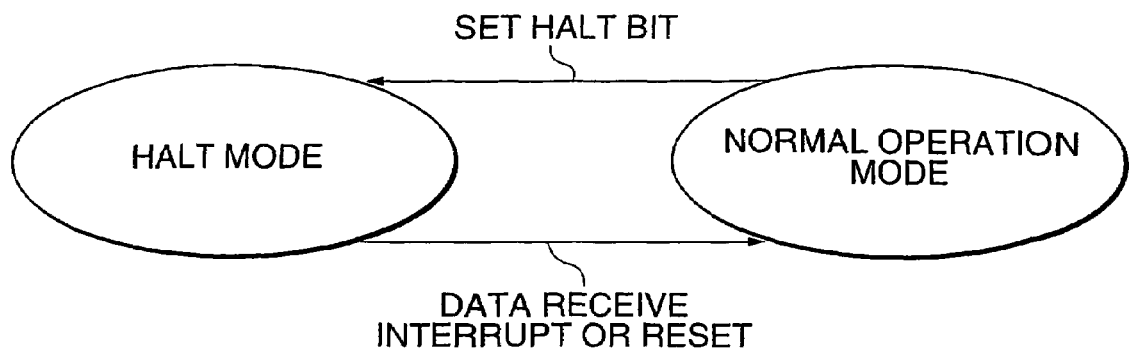
FIG. 5 is a state transition diagram of a HALT mode and a normal operation mode.

Thereby, the CPU 12 sets the HALT mode register, shifts the normal operation mode into the HALT mode, namely, the sleep mode, as shown in FIG. 5, and halts to supply the clock to the bridge image processing unit 14. With The transition to the HALT mode, the CPU 12 outputs a HALT state signal 50 to a REQ control unit 52.

In the normal operation mode in which the HALT state signal 50 is inactive, when a data transfer request signal 54 is outputted from the 100BT interface 32, the REQ control unit 52 outputs the data transfer request signal 54 to the DMAC 34.

The 100BT interface 32 includes a FIFO control unit 56 and a 100BT reception unit 58. The 100BT reception unit 58, receiving a data from an outside device, outputs the received data to the FIFO control unit 56. The FIFO control unit 56, storing a predetermined number of data pieces, outputs the data transfer request signal 54 to the REQ control unit 52.

When the data transfer request signal 54 is outputted from the REQ control unit 52, the DMAC 34 arbitrates the DMA transfer requests from the other modules, and outputs the DMA transfer request signal 38 to the CPU 12 to request the acquisition of the bus. Acquiring the bus, the DMAC 34 outputs an ACK signal 60 to the FIFO control unit 56, and outputs the DMA transfer request signal 38 to the timer 46. Thereby, the counter is reset. Receiving the ACK signal 60, the FIFO control unit 56 outputs stored data 61 to the DMAC 34. Thereby, the DMA transfer is executed between the DMAC 34 and the RAM 16.

And, when the DMA transfer is not executed for the specific time, the timer 46 outputs the time-out interrupt signal 48 to the CPU 12; and thereby, the current mode is shifted into the HALT mode in accordance with the foregoing procedure.

In the HALT mode in which the HALT state signal 50 is outputted, when receiving the data transfer request signal 54 from the 100BT interface 32, the REQ control unit 52 outputs an interrupt request signal 42C to the CPU 12. At this time, the data transfer request signal 54 to the DMAC 34 is set inactive in order that the DMA transfer is not executed. Thereby, as shown in FIG. 5, the CPU 12 shifts the current mode from the HALT made into the normal operation mode, resumes to supply the clock to the bridge image processing unit 14, and makes the HALT state signal 50 inactive. Also in case of the operation being reset, the CPU 12 shifts the current mode from the HALT mode into the normal operation mode as shown in FIG. 5.

And, receiving the HALT state signal 50 being inactive, the REQ control unit 52 activates the data transfer request signal 54 to the DMAC 34. Thereby, the DMA transfer is executed in accordance with the aforementioned procedure.

Figure 6:
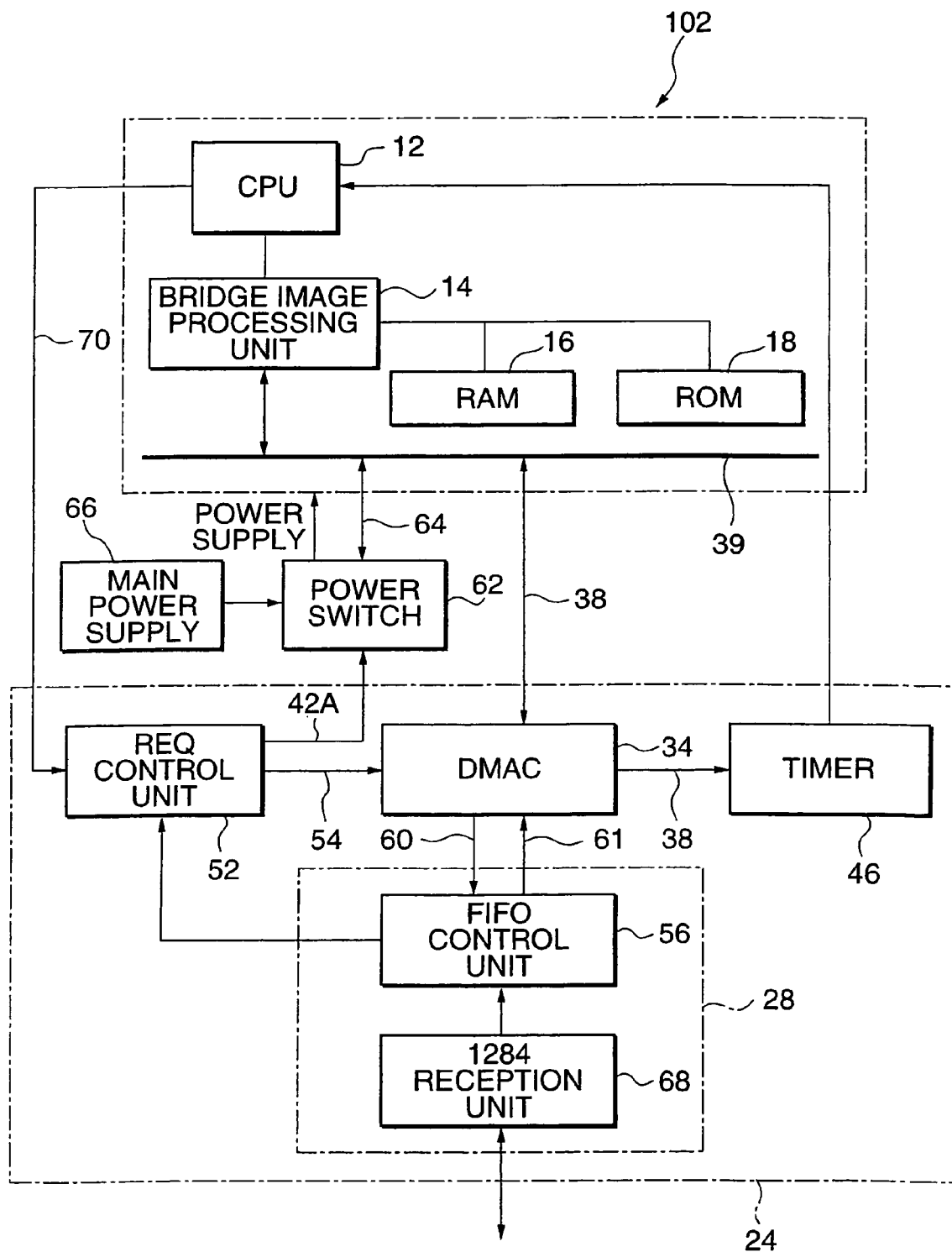
FIG. 6 is a diagram illustrating another example of the printer relating to the first embodiment.

Next, with regard to the transition to the power halt mode in case of non-connection with the Ethernet, another configuration will further be described with reference to FIG. 6. Here, the same parts as those of the printer 10 and 101 in FIG. 1 and FIG. 4 are given the same symbols, and the detailed explanations thereof will be omitted. Further, to simplify the explanation, the printing unit 22, buffer 26A, physical layer I/F 26C, 1284 interface 28, and 100BT interface 32 are omitted in the printer 102 in FIG. 6.

Figure 7:
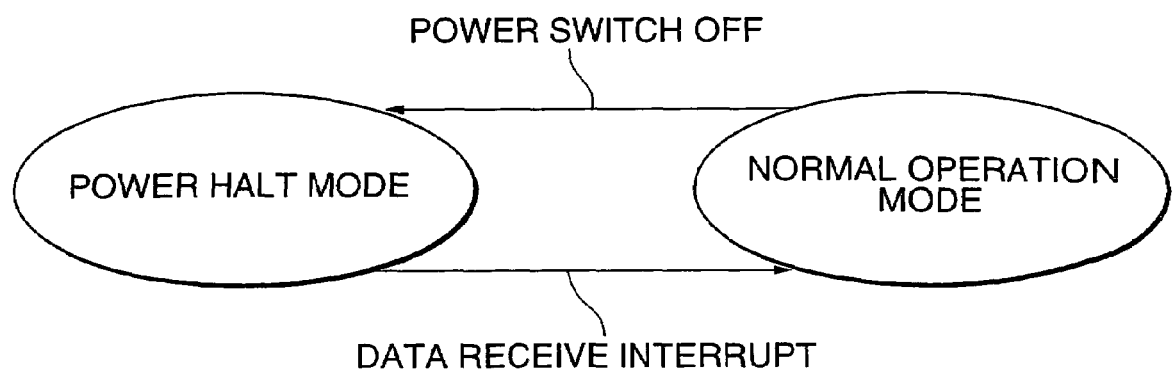
FIG. 7 is a state transition diagram of a POWER HALT mode and the normal operation mode.

When receiving the time-out interrupt signal 48 from the timer 46, the CPU12 executes the processing that is required prior to turning off power, and thereafter outputs a power-off inform signal 64 to a power switch 62 by way of the bridge image processing unit 14. Receiving the power-off inform signal 64, the power switch 62 halts the supply of power from a main power supply 66 to the CPU 12, bridge image processing unit 14, RAM 16, ROM 18, etc. Thereby, the current mode is shifted into the power halt mode as shown in FIG. 7. In this state, the power is supplied to the communication I/F 24 normally.

In this power halt mode, when a 1284 reception unit 68 receives a data from an outside device, the data is written into the FIFO control unit 56. The FIFO control unit 56, storing a predetermined number of data pieces, outputs the data transfer request signal 54 to the REQ control unit 52.

The REQ control unit 52, receiving the data transfer request signal 54, outputs an interrupt request signal 42A to the power switch 62. In this case, the REQ control unit 52 sets the data transfer request signal 54 to the DMAC 34 to be inactive.

Thereby, the power switch 62 resumes to supply the power to the CPU 12, bridge image processing unit 14, RAM 16, ROM 18, etc. And, as the supply of power resumes, the CPU 12 executes the BOOT processing. returns the current mode to the normal operation mode as shown in FIG. 7, and outputs a return signal 70 to the REQ control unit 52.

Receiving the return signal 70, the REQ control unit 52 sets the data transfer request signal 54 to the DMAC 34 active. Thereby, the DMAC 34 arbitrates the DMA transfer requests from the other modules, and outputs the DMA transfer request signal 38 to the CPU 12 to request the acquisition of the bus 39. And, acquiring the bus 39, the DMAC 34 outputs the ACK signal 60 to the FIFO control unit 56, and outputs the DMA transfer request signal 38 to the timer 46. Thereby, the counter is reset. Receiving the ACK signal 60, the FIFO control unit 56 outputs the stored data 61 to the DMAC 34. Thereby, the DMA transfer is executed between the DMAC 34 and the RAM 16.

During the halt of the supply of power, the 1284 reception unit 68 writes data until the FIFO of the FIFO control unit 56 becomes full with the data. At the moment that the FIFE becomes full, the 1284 reception unit 68 outputs a BUSY signal to the outside devices to thereby act a wait to them. And, when the FIFO makes an empty space with the foregoing DMA transfer, the 1284 reception unit 68 releases the BUSY signal to resume the reception of data.

Further, in case the USB interface 30 sets a wait to the outside deices, it is only needed to answer a NACK signal. The others are the same as above, and the explanations will be omitted.

Also in this embodiment, the DMAC 34 and the timer 46 are always supplied with the clock and power; however it is not limited to this, and the supply of clock or power to the DMAC 34 and the timer 46 may be designed to be halted, when the current mode is shifted into the sleep mode or the power halt mode.

Further, as the communication interface, the Ethernet such as the 100BASE-T, IEEE 1284, USB, etc., have been quoted as an example; however it is not limited to these, and the invention can be applied to a case in which the other communication interfaces such as the IEEE 1394, UART (Universal Asynchronous Receiver Transmitter: asynchronous serial communication), etc., are adopted.

Second Embodiment

Next, the second embodiment according to the invention will be described. In the second embodiment, a printer capable of a more effective control of the power consumption will be discussed.

Figure 8:
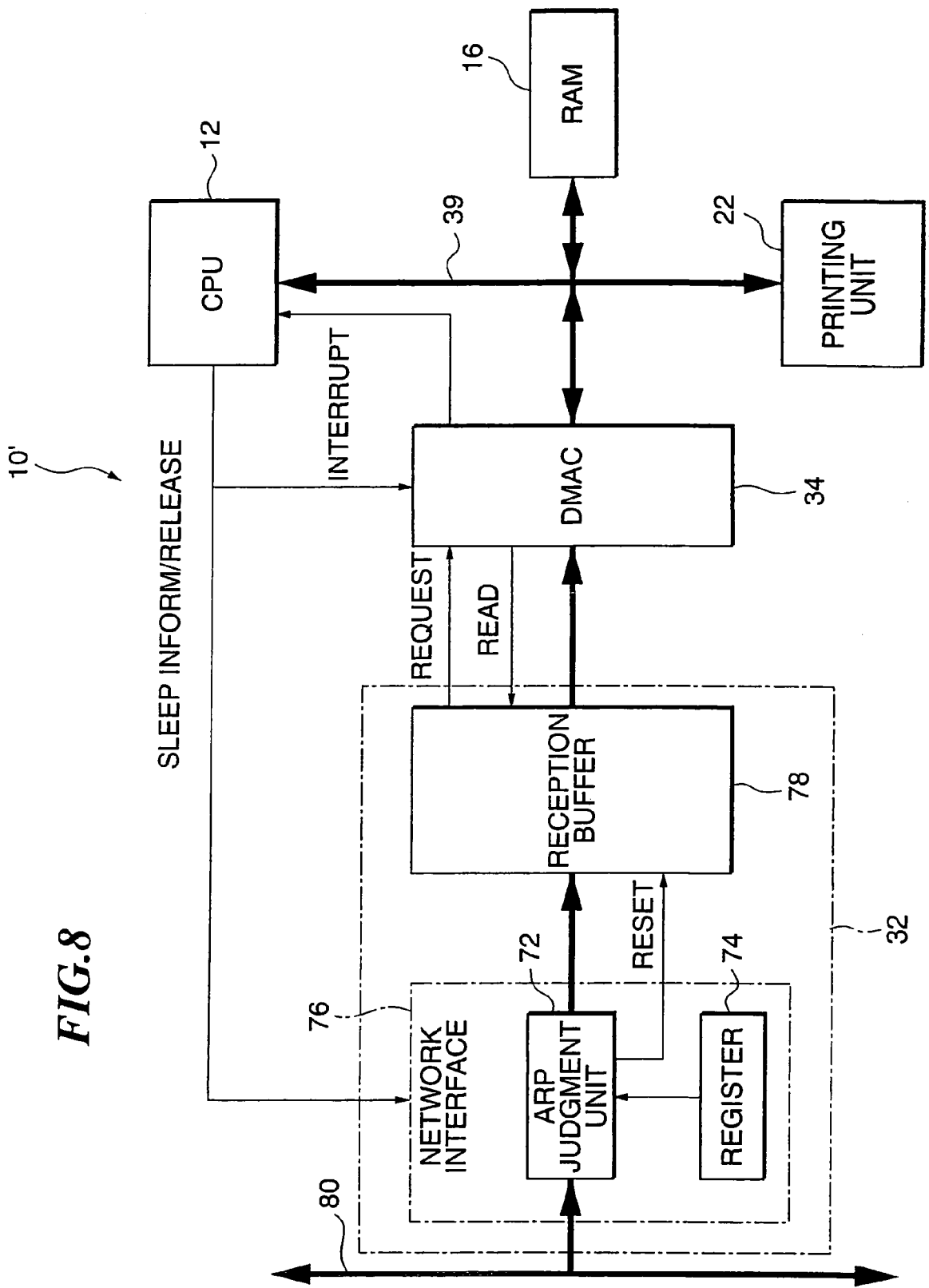
FIG. 8 is a schematic block diagram of a printer relating to the second embodiment.

FIG. 8 illustrates a printer 10' relating to the second embodiment, and takes up the characteristic parts of the printer 10'. And, the same parts as those of the printer 10 in FIG. 1 are given the same symbols, and the detailed explanations thereof will be omitted.

The 100BT interface 32 of the printer 10' shown in FIG. 8 includes a network interface 76 containing an ARP judgment unit 72 and a register 74, and a reception buffer 78. In FIG. 8, the thick lines indicate the flows of reception data, and the thin lines indicate the flows of signals such as control signals except for the reception data.

The ARP judgment unit 72 corresponds to the judgment unit and the power consumption control unit of the invention according to one aspect of the invention, and the reception buffer 78 corresponds to the memory unit of the invention according to one aspect of the invention.

In case the CPU 12 shifts the current mode into the sleep mode when the reception data does not arrive within a predetermined time, the CPU 12 beforehand outputs a sleep mode inform signal for informing the transition to the sleep mode to the DMAC 34 and the network interface 76.

Receiving the sleep mode inform signal, the DMAC 34 is brought into a state that the DMAC 34 is able to output an interrupt signal to the CPU 12 when receiving a request signal from the buffer 78. And, the network interface 76 is brought into a state where the network interface 76 is able to reset the reception buffer 78, namely, to erase data stored in the reception buffer 78 by giving a specific setting to the register 74.

Figure 9:
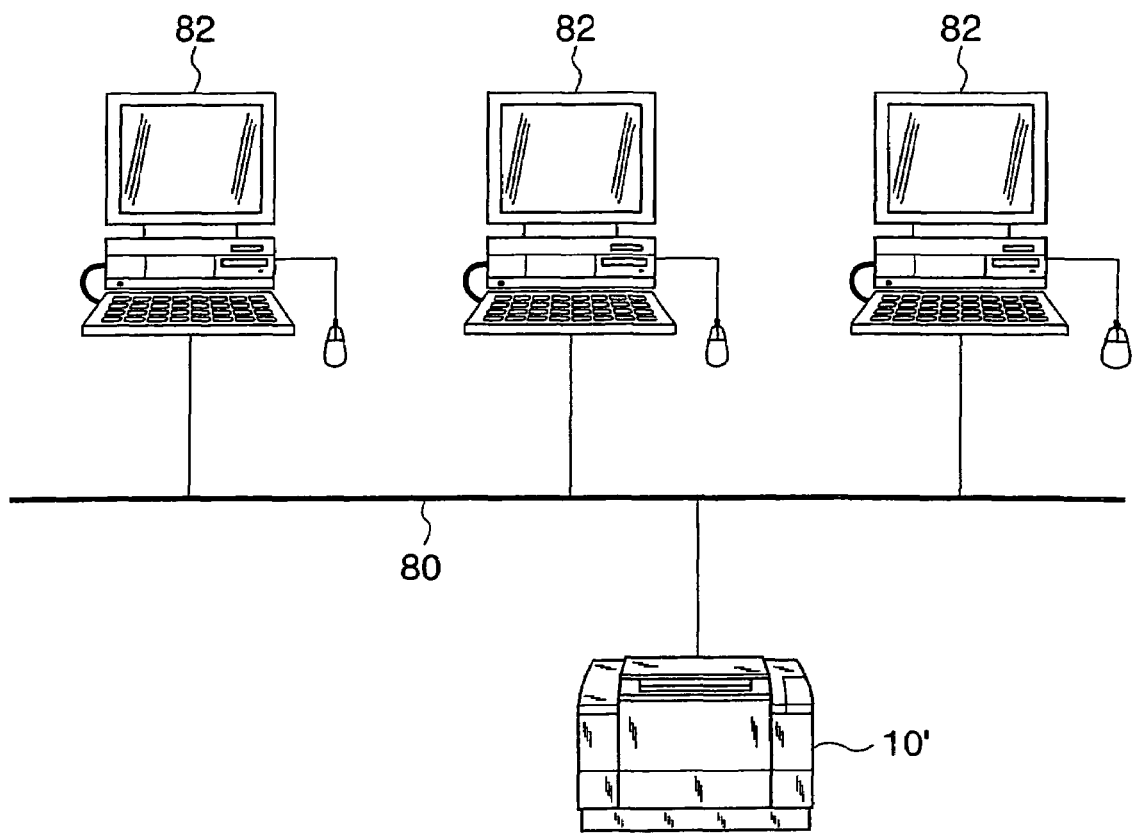
FIG. 9 is a chart illustrating a connection example of a network.

Receiving the sleep mode inform signal, the network interface 76 monitors data sent from a network 80, for example, data sent from host computers 82 as shown in FIG. 9, and starts the CPU 12 to judge whether the sleep mode is needed to be released. This judgment is made to prevent an unnecessary release of the sleep mode resulting from an unnecessary start of the CPU 12 by a reception of unnecessary control data, since the control data other than the printing data is busily flowing in a network such as a LAN.

When receiving control data to inquire an address, such as the ARP (Address Resolution Protocol) data, the ARP judgment unit 72 judges whether or not it is the ARP data addressed to the self-station; and if it is the ARP data addressed to the self-station, the ARP judgment unit 72 stores the received data in the reception buffer 78 as it is.

On the other hand, if it is not the ARP data addressed to the self-station, the ARP judgment unit 72 nullifies the received data to maintain the sleep mode. At this moment, since the reception buffer 78 has already had part of reception data stored, the ARP judgment unit 72 outputs a reset signal to the reception buffer 78. Thereby, the data in the reception buffer 78 is cleared.

Incidentally, the judgment as to whether it is the ARP data addressed to the self-station can be made by comparing the IP address of the self station registered in the register 74 with an IP address designated among the reception data.

Figure 10:
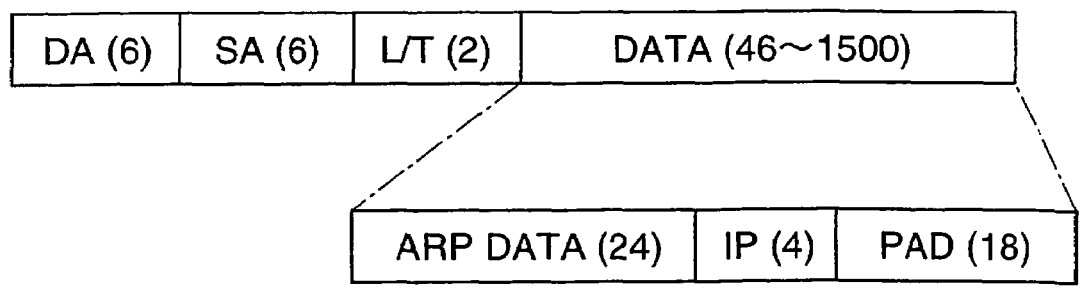
FIG. 10 is a chart illustrating a data configuration.

FIG. 10 illustrates one example of the data structure of data that flow through the network 80. As shown in FIG. 10, the inside of the reception data is divided into a DA (Destination Address) field (6 bytes) indicating a destination address of transmission, SA (Source Address) field (6 bytes) indicating a source address of transmission, L/T (Length or Type) field (2 bytes), and DATA field (46 bytes to 1500 bytes). Further, the DATA field is divided into an ARP_DATA field (24 bytes), IP (Internet Protocol) field (4 bytes), and PAD field (18 bytes, for example). Whether it is the ARP data addressed to the self-station can be judged by looking up the ARP_DATA field and the IP field. The PAD field is dummy data to make the DATA field, for example, 46 bytes.

The reception buffer 78 outputs a request signal indicating the existence of the reception data to the DMAC 34, when the number of the reception data stored exceeds a specific threshold. However, since it is judged to or not to output the request signal in the sleep mode, only when it is necessary to change the specific threshold and start the CPU 12 to release the sleep mode, the reception buffer 78 outputs the request signal to the DMAC 34.

Receiving the request signal from the reception buffer 78, the DMAC 34 outputs a read signal to the reception buffer 78, in order to transfer by DMA the data stored in the reception buffer 78 to the RAM 16, and also outputs an interrupt signal to the CPU 12.

Receiving the interrupt signal from the DMAC 34, the CPU 12 releases the sleep mode immediately, and starts the operation. To release the sleep mode, the CPU 12 outputs a sleep mode release signal to the DMAC 34 and the network interface 76, and shifts the current mode into the normal operation mode. Further, when the CPU 12 recognizes the data stored in the RAM 16 as data that is necessary to analyze and print by way of the bus 39, the CPU 12 powers the printing unit 22 to start the printing.

Figure 11:
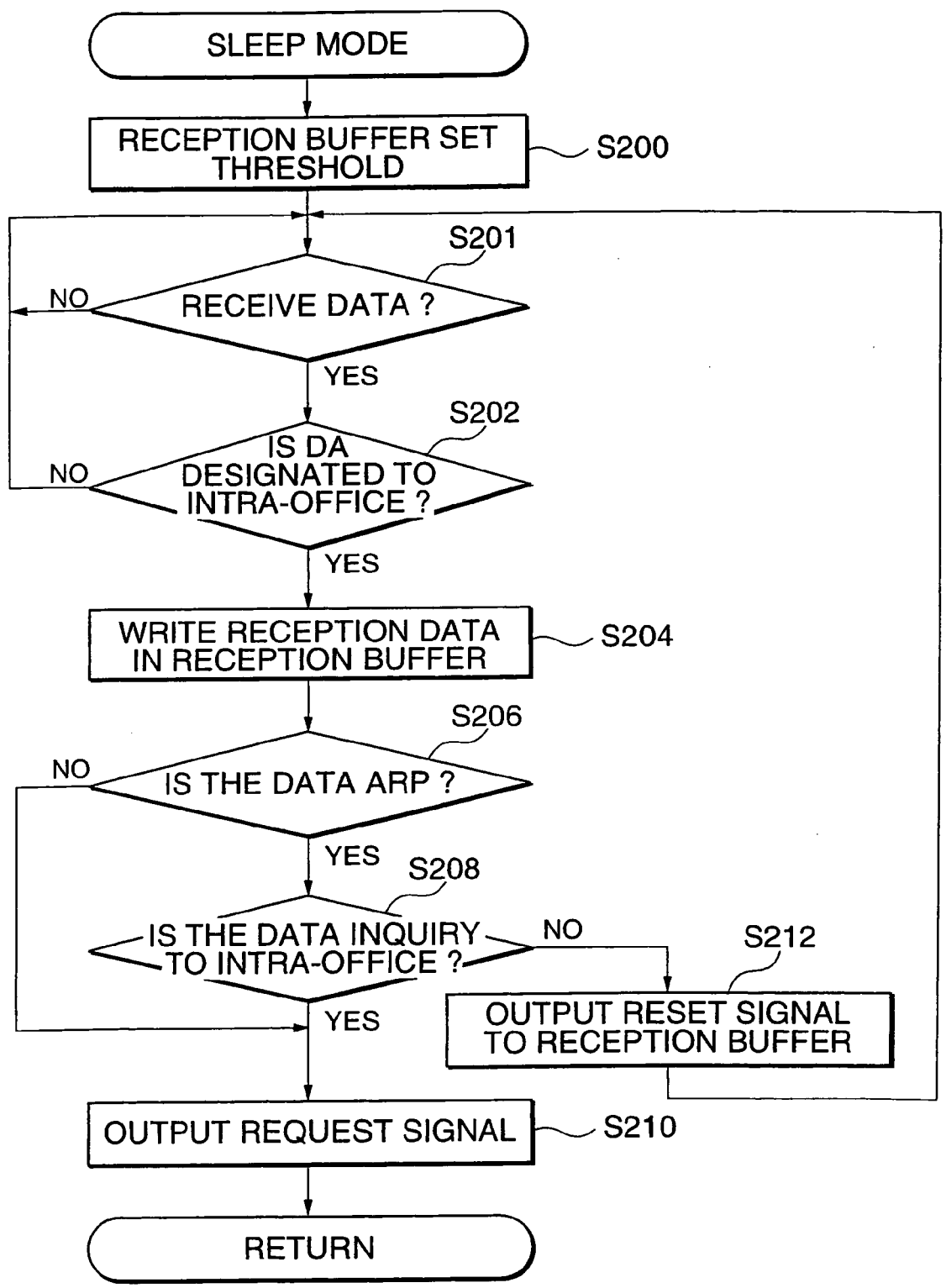
FIG. 11 is a flowchart of a control routine executed by a 100BT interface relating to the second embodiment.

Next, as the function of the second embodiment, the control routine executed in the 100BT reception unit 32 in the sleep mode will be explained with reference to the flowchart as shown in FIG. 11.

Figure 12A:
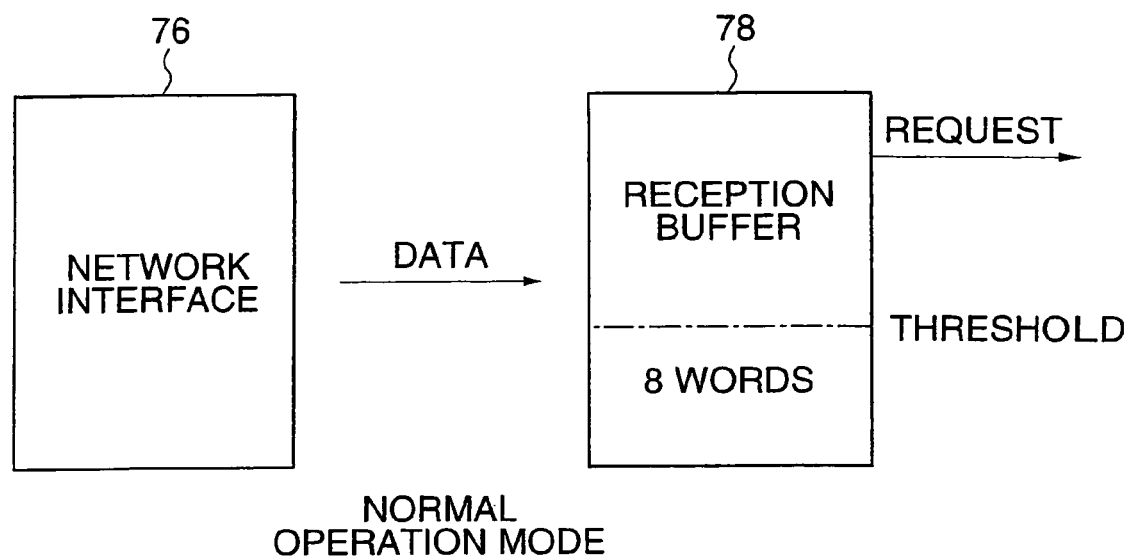
FIG. 12 is a chart explaining a threshold of a reception buffer.
Figure 12B:
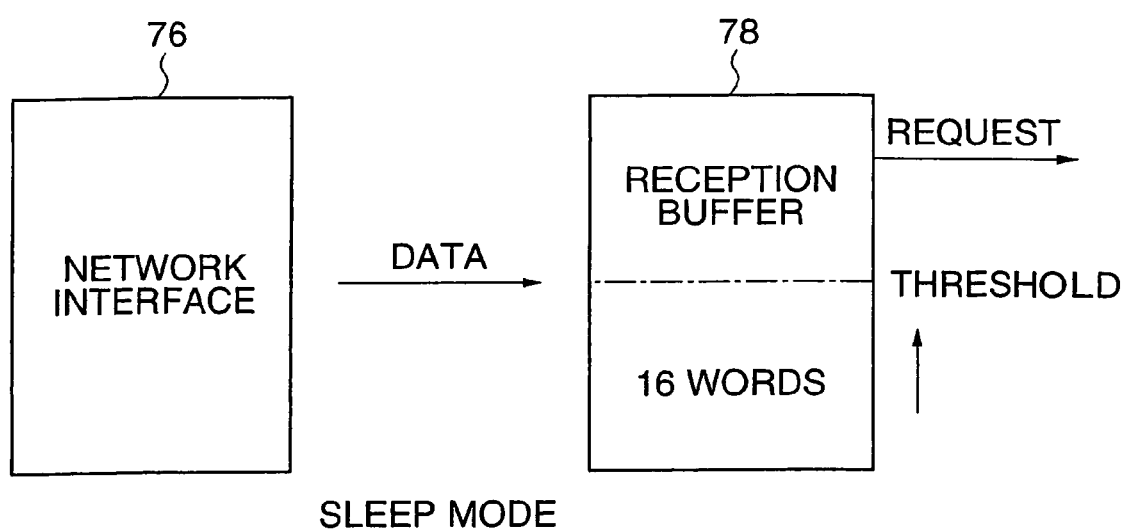

At step 200 shown in FIG. 11, a threshold is set in the reception buffer 78, by which the CPU 12 judges whether the reception buffer 78 outputs the request signal to the DMAC 34 or not. For example, as shown in FIG. 12A, when the threshold is set to 8 words in the normal operation mode, namely, when the setting is made to output the request signal to the DMAC 34 at the moment that the data stored in the reception buffer 78 is increased to 8 words or more, the threshold in the sleep mode is set to, for example, double, namely 16 words, as shown in FIG. 12B.

Since one word depends on the bit number of the register in the CPU 12, in case the bit number of the register in the CPU 12 is 32 bits (4 bytes), for example, the threshold in the normal operation mode is 32 bytes, and the threshold in the sleep mode is 64 bytes. Further, the threshold is set to a value such that the CPU 12 does not receive interruptions unnecessarily, in the consideration of the bit number of the register in the CPU 12 and the data structure of the reception data. That is, the threshold is set to a value of at least more than the number of data pieces from the leading of the reception data to the data (the data of the IP field, in case of the data structure shown in FIG. 10) by which it is judged to be the data addressed to the self station or not. Thereby, it is possible to prevent the CPU 12 from being interrupted, before the judgment as to the data being addressed to the self station or not is completed. In the foregoing example, since the data of the IP field is defined at the location of 39 to 42 bytes from the leading of the reception data, the request signal will not be outputted to the DMAC 34 before the judgment as to the data being addressed to the self station or not is completed.

After the threshold is set at step 200, the ARP judgment unit 72 judges to or not to have received data at the next step 201. If the data is not received, No at step 201, and the ARP judgment unit 72 waits till receiving data. If the data is received, Yes at step 201; and at the next step 202, the DA field is looked up, and the DA is judged to be addressed to the self station or not. If the DA is not addressed to the self station, No at step 202; and the ARP judgment unit 72 does not take in the data, the processing returns to step 201, and the ARP judgment unit 72 waits till receiving the next data.

On the other hand, if the DA is addressed to the self station, Yes at step 202, and at the next step 204, the ARP judgment unit 72 writes the received data in the reception buffer 78. Next, at step 206, the ARP field is looked up, the received data is judged to be the ARP data or not. If not, the judgment at step 206 is negative, and the processing advances to step 210.

On the other hand, if the received data is the ARP data, Yes at step 206; and the ARP judgment unit 72 looks up the IP field at the next step 208, and compares it with the IP address registered in the register 74. And, if the IP address of the IP field is coincident with the IP address registered in the register 74, namely, if it is the ARP data addressed to the self station, Yes at step 208, and the processing advances to step 210.

At step 210, the request signal is outputted to the DMAC 34 by the reception buffer 78, at the moment that the number of reception data pieces exceeds the threshold. The DMAC 34 outputs the read signal to the reception buffer 78, and also outputs the interrupt signal to the CPU 12. Thereby, the operation shifts from the sleep mode into the normal operation mode, and accordingly the DMA transfer is executed between the DMAC 34 and the RAM 16.

On the other hand, if the received data is not addressed to the self station, No at step 208, and the ARP judgment unit 72 outputs the reset signal to the reception buffer 78 at step 212, and the processing returns to step 201 to repeat the same. Thereby, the data stored in the reception buffer is erased, and the sleep mode is maintained. As mentioned above, since the threshold of the reception buffer 78 is set to a value of the number of data pieces or more from the leading of the reception data to the data by which it is judged to be the data addressed to the self station or not, there is not any possibility that the request signal is outputted to the DMAC 34 before the judgment as to The data being addressed to the self station or not is completed, whereby the CPU 12 is interrupted.

In this manner, during the sleep mode while receiving data, it is judged to or not to output the request signal to the DMAC 34, namely, to or not to give an interrupt to the CPU 12; and if the data is not addressed to the self station, the data stored in the reception buffer 78 is erased, and the sleep mode is maintained. Therefore, the CPU 12 will not be started unnecessarily, whereby effective control for saving the power can be achieved.

Third Embodiment

Figure 13:
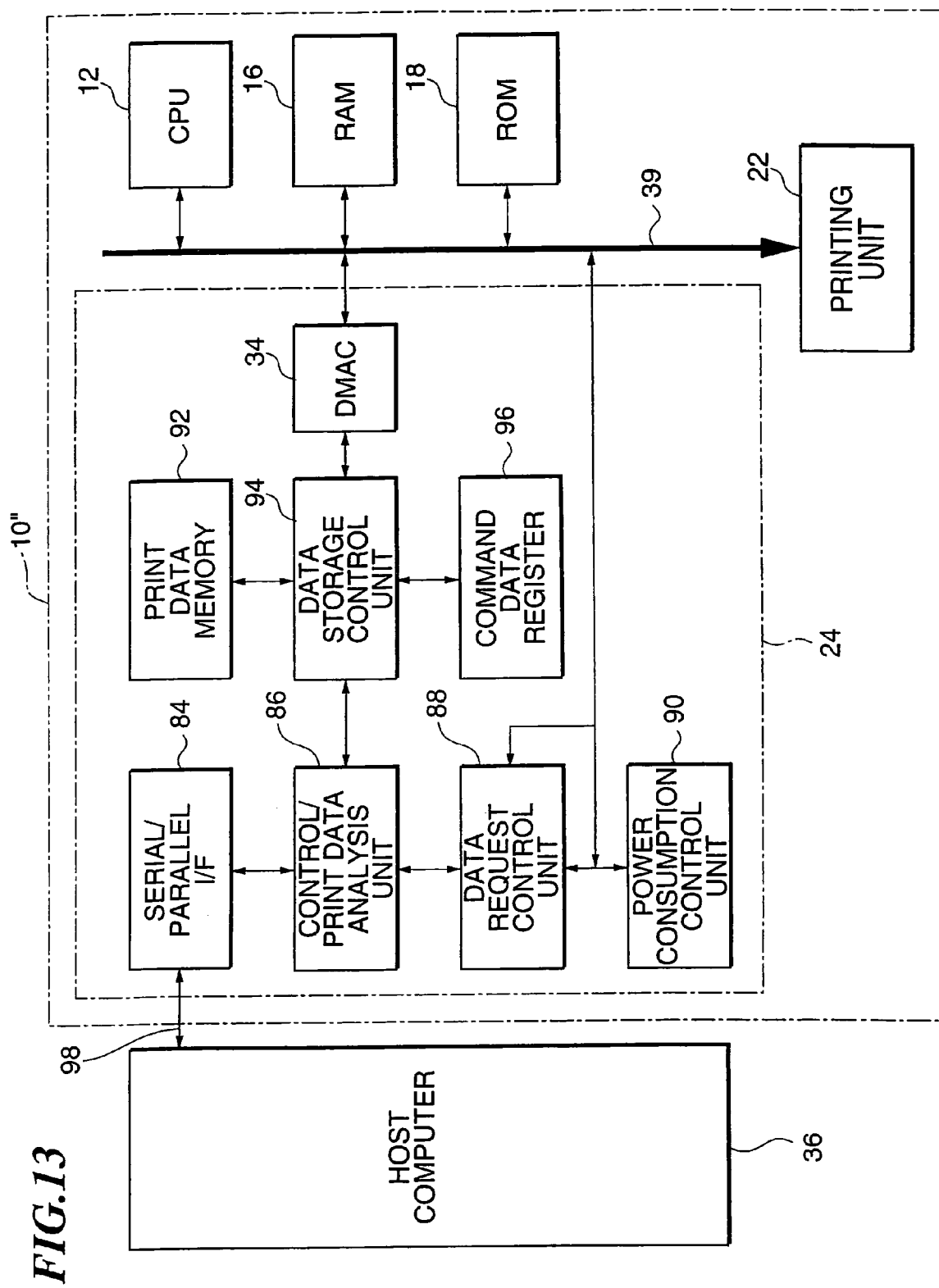
FIG. 13 is a schematic block diagram of a printer relating to the third embodiment.

Next, the third embodiment will be described. FIG. 13 illustrates a schematic block diagram of a printer relating to the third embodiment, in which the same symbols are given to the same parts as the printer 10 in FIG. 1, and the detailed explanations thereof will be omitted.

The communication I/F 24 of the printer 10" shown in FIG. 13 includes a serial/parallel I/F 84, a control/print data analysis unit 86, a data request control unit 88, a power consumption control unit 90, a print data memory 92, a data storage control unit 94, a command data register 96, and the DMAC 34. Further, the printer 10" is connected to the host computer 36 by a serial bus 98 (for example, USB).

The serial/parallel I/F 84, while executing the handshake control with the host computer 36, converts the data from the host computer 36 from serial into parallel to output the result to the control/print data analysis unit 86, and converts the data from the control/print data analysis unit 86 from parallel into serial to output the result to the host computer 36.

The control/print data analysis unit 86 analyzes the control commands and print data from the host computer 36. The data request control unit 88 informs of the data transmission, etc., from the host computer 36 to the CPU 12.

The power consumption control unit 90 responds the sleep mode permission and informs of the sleep mode release to the CPU 12. The informing timing of the sleep mode release is set by the CPU 12, which is determined on the basis of the frequency, quantity, response time, etc., of the communications from the host computer 36 to the printer 10". And, this setting can be carried out independently individually in regard to the control system communication and the print system communication. When the communication from the host computer 36 to the printer 10" is provided with the protocol of four types, such as a control command transfer, control command request, print data transfer, and print status request, in setting an informing timing of the sleep mode release based on the communication frequency, the CPU 12 sets the communication frequency of the control system communication by the control command transfer and control command request as a frequency a, and the communication frequency of the print system communication by the print data transfer and print status request as a frequency b to the power consumption control unit 90. Thereby, the power consumption control unit 90 informs of the sleep mode release to the CPU 12, at the moment that the communication frequency from the host computer 36 to the printer 10" in case of the control system communication reaches the frequency a, and the communication frequency from the host computer 36 to the printer 10" in case of the print system communication reaches the frequency b.

Similarly, in setting an informing timing of the sleep mode release based on the communication quantity, the CPU 12 sets the communication quantity of the control system communication as c bytes, and the communication quantity of the print system communication as d bytes to the power consumption control unit 90. Thereby, the power consumption control unit 90 informs of the sleep mode release to the CPU 12, at the moment when the communication quantity from the host computer 36 to the printer 10" in case of the control system communication reaches c bytes, and the communication quantity from the host computer 36 to the printer 10" in case of the print system communication reaches d bytes.

Further, in setting an informing timing of the sleep mode release based on the communication response time, for example, the CPU 12 sets the communication response time of the control system communication as e seconds, and the communication response time of the print system communication as f seconds to the power consumption control unit 90. Thereby, the power consumption control unit 90 informs of the sleep mode release to the CPU 12 e seconds after the moment when the printer 10" receives a control system command in case of the control system communication, and f seconds after the moment when the printer 10" receives print system data and command in case of the print system communication. The reason of this setting lies in that, since the power consumption control unit 90 is able to predict time till receiving the next data after receiving the control system command and the print system command and data, the power consumption control unit 90 does not release the sleep mode immediately after receiving the control system command and the print system command and data, and maintains the CPU 12 in the sleep mode as long as possible. Therefore, preferably the values of the e and f are set slightly shorter than predicted times till receiving the next data after receiving the control system command and the print system command and data. Thereby, more effective power saving can be achieved.

The values of the a through the f may be fixed values, or they may be altered every time on the basis of the historical data before shifting to the sleep mode.

The print data memory 92 stores print data. The data storage control unit 94 makes the command data register 96 temporarily store a data corresponding to the data transmission request from the host computer 36.

Further, the CPU 12 as the setting unit is able to set whether to or not to make the command data register 96 temporarily store the data corresponding to the data transmission request.

Next, as the function of the third embodiment, the control routine executed in the communication I/F 24 will be explained with reference to the flowchart shown in FIG. 14.

Figure 14A:
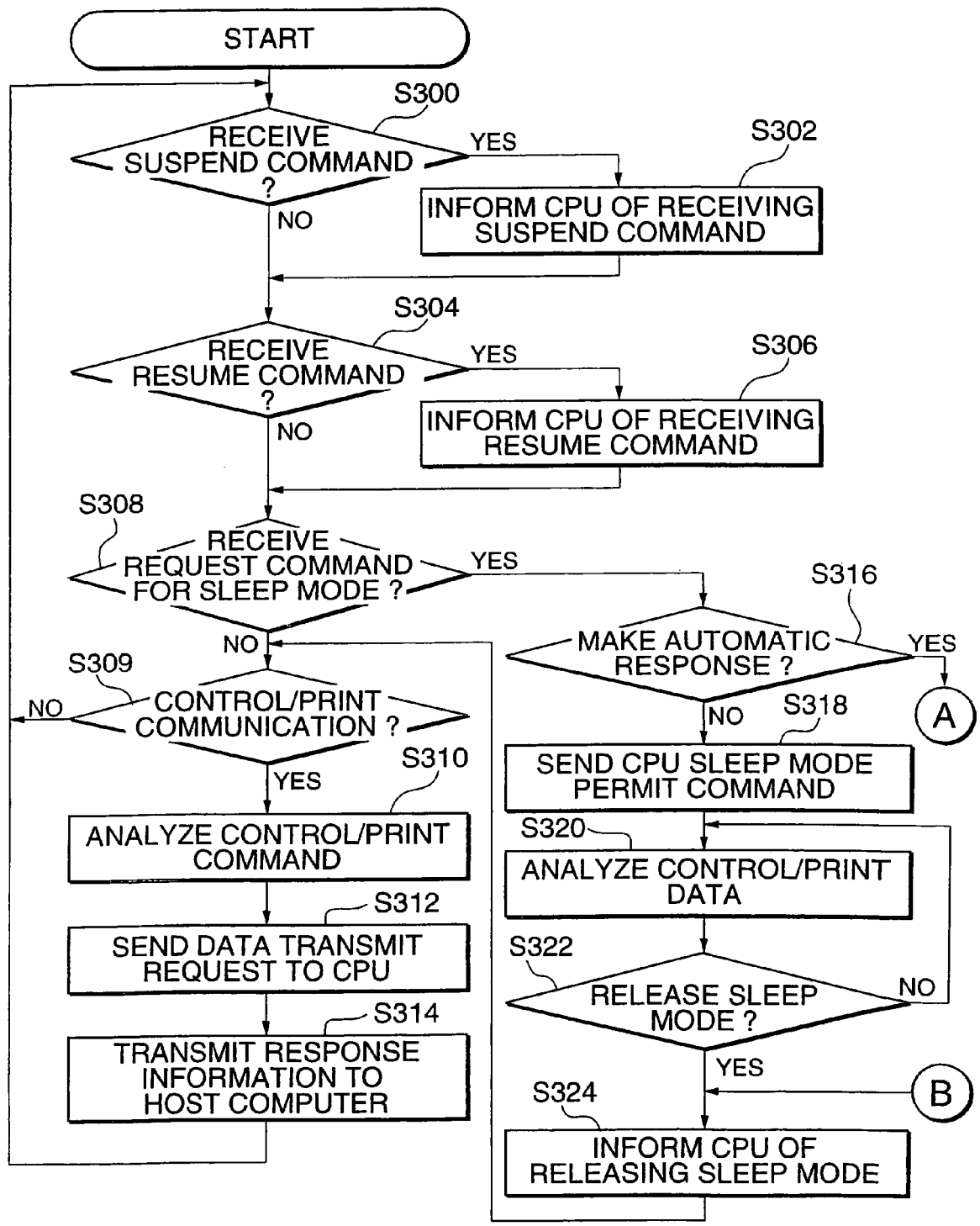
FIG. 14 is a flowchart of a control routine executed in a power control unit relating to the third embodiment.
Figure 14B:
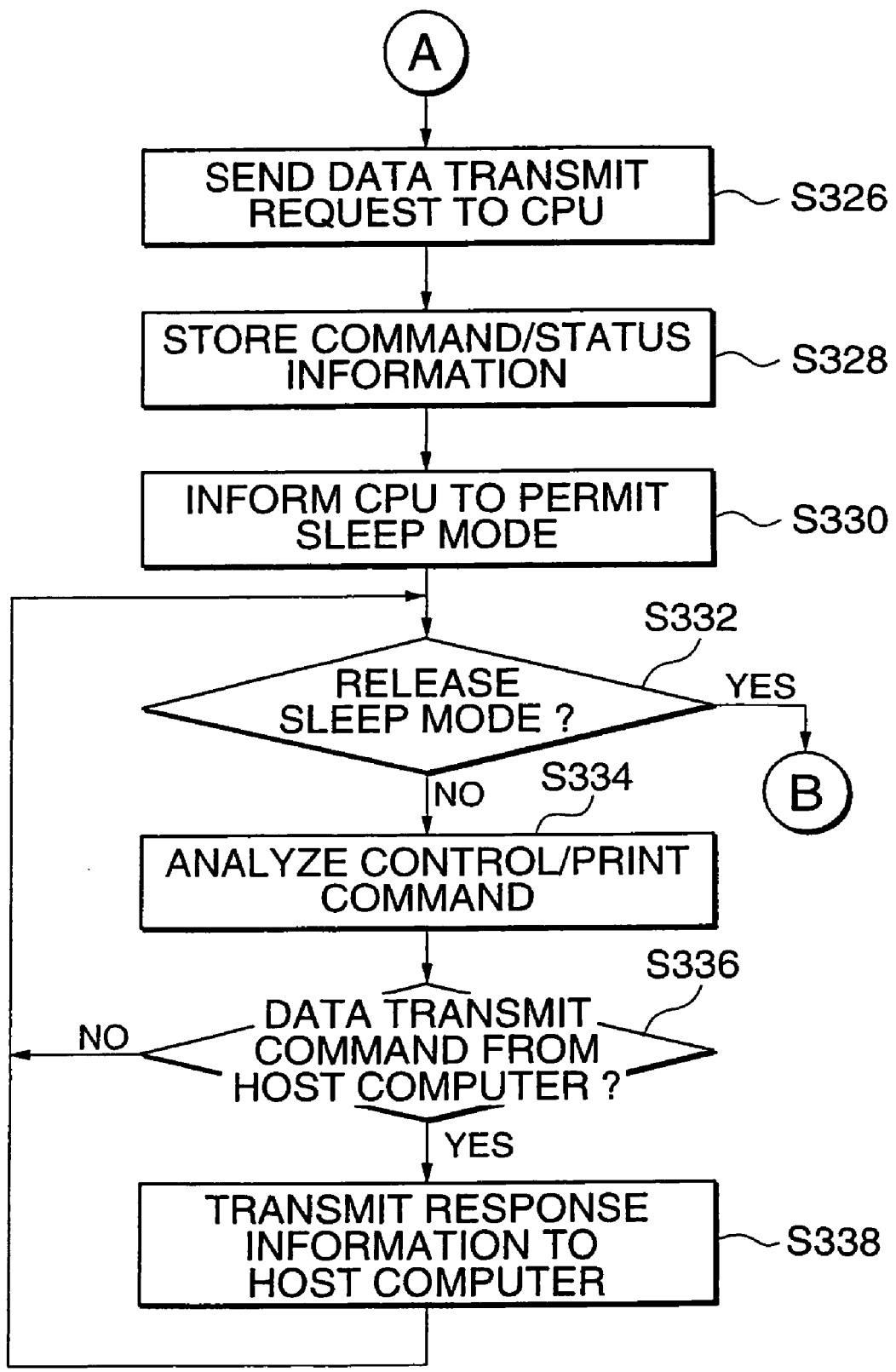

At step 300 shown in FIG. 14, it is judged whether a suspend command, namely, a command to instruct the transition to the sleep mode is received from the host computer 36. If the suspend command is received from the host computer 36, yes at step 300, and the CPU 12 is informed of receiving the suspend command at step 302.

If the suspend command is not received, No at step 300, and it is judged whether a resume command, namely, a command to instruct the release of a power saving command is received from the host computer 36, at the next step 304. If the resume command is received, Yes at step 304, and the CPU 12 is informed of receiving the resume command at step 306.

If the resume command is not received, No at step 304, and it is judged whether a sleep mode permission request command, namely, a command to request the permission to shift into the sleep mode is received from the CPU 12, at the next step 308.

If the sleep mode permission request command is not received, No at step 308, and whether or not it is a control/print system Is judged at step. 309. If it is not the control/print system communication, No at step 309, and the processing returns to step 300. If it is the control/print system communication, Yes at step 309, and the command is analyzed by the control/print data analysis unit 86 at the next step 310, and the processing advances to step 312.

On the other hand, if the sleep mode permission request command is received, Yes at step 308; and the power consumption control unit 90 temporarily stores in advance an information corresponding to the data transmission request from the host computer 36 in the command data register 96 at step 316, and judges whether to or not to automatically respond not by way of the CPU 12, when in the sleep mode the data transmission request command is transmitted by the host computer 36. This is set in advance by the CPU 12.

If the setting is made not to temporarily store in advance the information corresponding to the data transmission request from the host computer 36 in the command data register 96, No at step 316, and the power consumption control unit 90 informs the CPU 12 of a sleep mode permission respond command, namely, a command indicating permission of the sleep mode by way of the bus 38, at the next step 318. Receiving this command, the CPU 12 shuts off the power to the printing unit 22, and halts the clock to shift the current mode into the sleep mode. Incidentally, the information corresponding to the data transmission request from the host computer 36 is, for example, a status or command of the printer 10", which can be set individually by the CPU 12.

Next, at step 320, a serial command transmitted from the host computer 36 by way of the serial bus 98 is converted into a parallel command by the serial/parallel I/F 84, and the command is analyzed by the control/print data analysis unit 86.

At the next step 322, it is judged whether or not the analyzed command is the data transmission command and the sleep mode is to be released. If the analyzed command is the data transmission command, Yes at step 322, and the control/print data analysis unit 86 informs the power consumption control unit 90 of releasing the sleep mode by way of the data request control unit 88. And, the power consumption control unit 90 informs the CPU 12 of releasing the sleep mode by way of the bus 39. Thereby, the CPU 12 releases the sleep mode.

Next, at step 310, the data request control unit 88 sends the data transmission request command to the CPU 12 by way of the bus 39. At this moment, since the information corresponding to the data transmission request is not stored in the command data register 96, the serial/parallel I/F 84 sends a NAK signal to the host computer 36 by way of the serial bus 98.

At the next step 312, the information corresponding to the data transmission request is transmitted by the CPU 12 to the data storage control unit 94 by way of the bus 39 and the DMAC 34. The data storage control unit 94 temporarily stores this information in the command data register 96. The CPU 12, after transmitting all the data, informs the data storage control unit 94 that the setting of transferred data is completed.

And, at step 314, when the data transmission command is transmitted again from the host computer 36, the information corresponding to the data transmission request command temporarily stored In the command data register 96 is sent to the control/print data analysis unit 86 by way of the data storage control unit 94. To this data, the control/print data analysis unit 86 applies a command processing, the result of which the serial/parallel I/F 84 converts into a serial command and transmits to the host computer 36. When succeeding in analyzing this serial command normally, the host computer 36 sends the ACK signal to the printer 10".

On the other hand, if the setting is made to temporarily store in advance the information corresponding to the data transmission request from the host computer 36 in the command data register 96, namely, if the setting is made to automatically respond, Yes at step 316, and the power consumption control unit 90 requests at step 326 the information corresponding to the data transmission request to the CPU 12.

At the next step 328, the CPU 12 temporarily stores the requested information in the command data register 96 by way of the bus 39, DMAC 34, and the data storage control unit 94, and informs the data storage control unit 94 that the setting of the transmission request data is completed.

At the next step 330, the power consumption control unit 90 informs the CPU 12 of the sleep mode permission by way of the bus 39. Receiving this, the CPU 12 shuts off the power to the printing unit 22, and halts the clock to shift the current mode into the sleep mode.

At the next step 332, whether the sleep mode is to be released or not is judged by the power consumption control unit 90. As mentioned above, this is judged on the basis of the frequency, quantity, response time, etc., of the communication from the host computer 36 to the printer 10". If the power consumption control unit 90 judges to release the sleep mode, Yes at step 332, and it informs the CPU 12 to release the sleep mode at step 324. If it judges to maintain the sleep mode, No at step 332, and the processing advances to step 334.

At step 334, the serial command transmitted from the host computer 36 by way of the serial bus 98 is converted into the parallel command by the serial/parallel I/F 84, and the command is analyzed by the control/print data analysis unit 86.

At the next step 336, the analyzed command is judged to be the data transmission request command or not. If the analyzed command is the data transmission request command, Yes at step 336; and at the next step 338, the data stored in the command data register 96 is sent to the control/print data analysis unit 86 by way of the data storage control unit 94 without the intervention of the CPU 12, and after applying the command processing to the data and converting it into a serial command, the serial/parallel I/F 84 transmits the serial command to the host computer 36.

In this manner, it is possible to automatically transmit a data from the command data register 96 to the host computer 36 without intervention of the CPU 12. Further, since this data remains to be held in the command data register 96 even in the sleep mode, the command data register 96 is able to repetitively respond to the data transmission request from the host computer 36. The host computer 36 outputs the ACK signal, when it succeeds in normally analyzing the data from the printer 10".

Thus, when the CPU 12 is in the sleep mode, since it is possible to automatically respond to the data transmission request from the host computer 36 without intervention of the CPU 12, namely, with the sleep mode maintained, the power consumption can be reduced to a great extent. Further, since the timing of releasing the sleep mode is made to be changed by the frequency, quantity, response time of the communication, etc., a still more appropriate power saving control can be implemented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer provided with a printing part that prints on the basis of print data from a host device, and a control part that operates by a clock input and controls the printing part, the printer having a sleep mode in which the power to the printing part is shut off and the control part halts a clock signal that is used during normal printing operations of the printer, the printer comprising:

a judgment part that judges, when in the sleep mode, whether reception data from the host device is necessary data for printing;

a storage part that stores the reception data; and a power saving control part that releases the sleep mode when the reception data is judged by the judgment part to be necessary data for printing, and erases the reception data stored in the storage part when the reception data is judged by the judgment part to be unnecessary data for printing without releasing the sleep mode.

2. A printer according to claim 1, wherein the power saving control part releases the sleep mode when a quantity of the reception data stored in the storage part exceeds a threshold value.

3. A printer according to claim 2, wherein the threshold value is 16 bytes.

4. A printer according to claim 1, wherein the power saving control part is an address resolution protocol (ARP) judgment unit.

5. A printer according to claim 1, wherein, during the sleep mode, the clock signal is halted to a processor.

6. A printer according to claim 1, wherein, during the sleep mode, power is shut off to a processor.

7. A printer connected to a host device, the printer having a sleep mode in which power and clock signals used by parts of the printer during normal printing operations are halted, the printer comprising:

a processor that receives a clock signal;

a printing part that prints on the basis of print data from the host device;

a control part that (1) operates by a clock input and controls the printing part, (2) determines when the printer should enter into the sleep mode, and (3) when the printer is in the sleep mode, halts the output of the clock signal to the processor;

a storage part that stores reception data received from the host device;

a judgment part that, when the printer is in the sleep mode, judges whether the reception data from the host device is necessary data for printing and erases the reception data stored in the storage part without releasing the sleep mode when the reception data is judged by the judgment part to be unnecessary data for printing; and a power saving control part that, when the reception data is necessary data for printing, receives the reception data and releases the sleep mode.

8. A printer connected to a host device, the printer having a sleep mode in which power and clock signals used by parts of the printer during normal printing operations are halted, the printer comprising:

a power source;

a processor that receives power from the power source;

a printing part that prints on the basis of print data from the host device;

a control part that (1) operates by a clock input and controls the printing part, (2) determines when the printer should enter into the sleep mode, and (3) when the printer is in the sleep mode, halts the supply of power to the processor;

a storage part that stores reception data received from the host device;

a judgment part that, when the printer is in the sleep mode, judges whether the reception data from the host device is necessary data for printing and erases the reception data stored in the storage part without releasing the sleep mode when the reception data is judged by the judgment part to be unnecessary data for printing; and a power saving control part that, when the reception data is necessary data for printing, receives the reception data and releases the sleep mode.

* * * * *